US007535191B2

(12) United States Patent
Adachi et al.

(10) Patent No.: US 7,535,191 B2
(45) Date of Patent: May 19, 2009

(54) POWER WINDOW DEVICE

(75) Inventors: Takayuki Adachi, Aichi (JP); Hirofumi Moriya, Aichi (JP); Yasuhiro Shimomura, Aichi (JP); Shinji Shimoie, Aichi-ken (JP)

(73) Assignees: Kabushiki Kaisha Tokai Rika Denki Seisakusho, Aichi (JP); Toyota Jidosha Kabushiki Kaisha, Aichi-ken (JP)

( * ) Notice: Subject to any disclaimer, the term of this patent is extended or adjusted under 35 U.S.C. 154(b) by 422 days.

(21) Appl. No.: 11/355,635

(22) Filed: Feb. 16, 2006

(65) Prior Publication Data

US 2006/0208676 A1 Sep. 21, 2006

(30) Foreign Application Priority Data

Feb. 18, 2005 (JP) ............................. 2005-042598

(51) Int. Cl.
*G05B 5/00* (2006.01)

(52) U.S. Cl. ....................... 318/469; 318/468; 318/466; 318/458

(58) Field of Classification Search ................. 318/468, 318/469, 466, 458, 434, 280, 286, 471; 361/23
See application file for complete search history.

(56) References Cited

U.S. PATENT DOCUMENTS 5,483,135 A 1/1996 Parks
5,912,537 A * 6/1999 Yang .......................... 318/280
6,205,010 B1 * 3/2001 Ohsaka et al. .............. 361/103
6,281,648 B1 8/2001 Iwata et al.
2004/0183493 A1 * 9/2004 Boisvert et al. ............. 318/469

FOREIGN PATENT DOCUMENTS

| | | | |
|---|---|---|---|
| DE | 195 14 954 | A1 | 12/1995 |
| GB | 2 266 389 | A | 10/1993 |
| JP | 7-99754 | A | 4/1995 |
| JP | 8-254071 | A | 10/1996 |
| JP | 2005-27452 | A | 1/2005 |
| JP | 2005-57452 | A | 1/2005 |

* cited by examiner

*Primary Examiner*—Karen Masih
(74) *Attorney, Agent, or Firm*—Crompton, Seager & Tufte, LLC

(57) ABSTRACT

A power window device that suppresses heating in a motor used to lower and raise a window glass. For each door of a vehicle, the power window device includes an ECU that controls a motor in accordance with the operation of a switch to raise the window glass. A pulse sensor is arranged in the vicinity of the motor to detect the rotation speed of the motor and generate a detection signal. Based on the pulse signal of the pulse sensor, the ECU determines whether the window glass has reached a fully open or fully closed position. When it is determined that the motor has become locked or that the window glass has reached the fully open or fully closed position, the ECU deactivates the motor until predetermined activation conditions are satisfied.

20 Claims, 3 Drawing Sheets

POWER WINDOW DEVICE

BACKGROUND OF THE INVENTION

The present invention relates to a power window device for automatically lowering and raising a window member by operating a switch.

In the prior art, a power window device is installed in a door of a vehicle to facilitate the lowering and raising of a window glass (opening and closing of a window) in the door. For each door of a vehicle, the power window device includes a window switch, which is operated by a vehicle occupant when lowering or raising the window glass of the door, and a motor, such as a DC motor, for lowering or raising the window glass. When a window switch is operated, the associated motor is driven to produce rotation that lowers or raises the corresponding window glass.

In such a power window device, if a large load is applied to the motor when lowering or raising the window glass, the motor may become locked. For example, the motor becomes locked when the window glass reaches a fully open position or fully closed position. In such a case, the motor stops moving the window glass. Japanese Laid-Open Patent Publication No. 8-254071 describes a power window device including a shunt resistor arranged between the motor and ground. A temperature detector detects the temperature of the shunt resistor. If a large load is continuously applied to the window glass when the motor is driven to lower or raise the window glass such as when the window glass has already reached the fully closed position, the current flowing through the shunt resistor increases. This heats and increases the temperature of the shunt resistor. When the temperature detector detects an excessive temperature increase in the shunt resistor, the motor is inactivated.

Another type of power window device includes a positive coefficient heater (PTC) thermistor, which is arranged in the vicinity of the motor, to cope with large loads applied to the motor. If the motor is continuously driven after the window glass reaches the fully open or closed position, the temperature of the motor increases. When the motor temperature becomes excessively high, the resistance of the PTC thermistor suddenly increases and stops the flow of current to the motor. This PTC thermistor effect inactivates the motor and stops the lowering or raising of the window glass.

Referring to FIG. 4, continuous or repetitive operation of the window switch after the window glass reaches the fully open or fully closed position may result in the occurrence of the PTC thermistor effect. In such a case, the window glass cannot be moved when the vehicle occupant operates the window switch. Furthermore, much time may be necessary for the motor to cool down until the PTC thermistor returns to a normal state so as to enable the vehicle occupant to operate the window glass again. As a result, the vehicle occupant may erroneously determine that there is an anomaly in the power window device even though the power window device is functioning normally. Accordingly, when the vehicle occupant operates the window switch, it is desirable that the heating of the motor be suppressed to avoid the PTC thermistor effect. The same problem occurs when using the above shunt resistor and temperature detector to monitor excessive increase in the motor temperature.

SUMMARY OF THE INVENTION

The present invention provides a power window device that suppresses heating of a motor used to lower and raise a window member.

One aspect of the present invention is a power window device for moving a window member in a first direction and a second direction opposite the first direction. The power window device includes a switch operated when moving the window member in the first direction or the second direction. An actuator moves the window member in accordance with the operation of the switch. A sensor generates a detection signal that is based on activation state of the actuator and indicates whether or not the window member is moving. A controller, which is connected to the switch, the actuator, and the sensor, activates the actuator in response to the operation of the switch to move the window member, determines from the sensor detection signal when the window member is not moving even though the actuator is activated, and deactivates the actuator if the determination is that the window is not moving and the actuator is activated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 2:
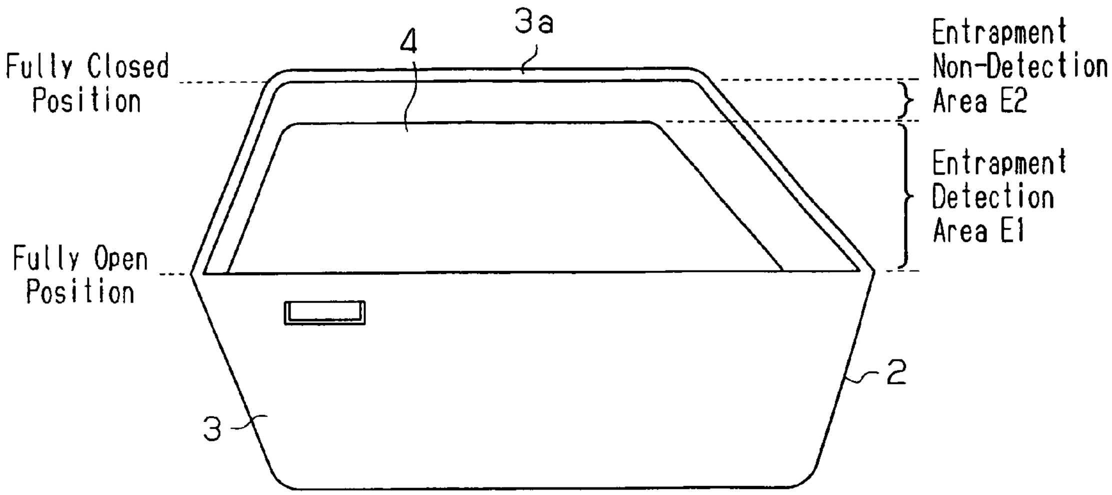
FIG. 2 is a side view showing a vehicle door.
Figure 3:
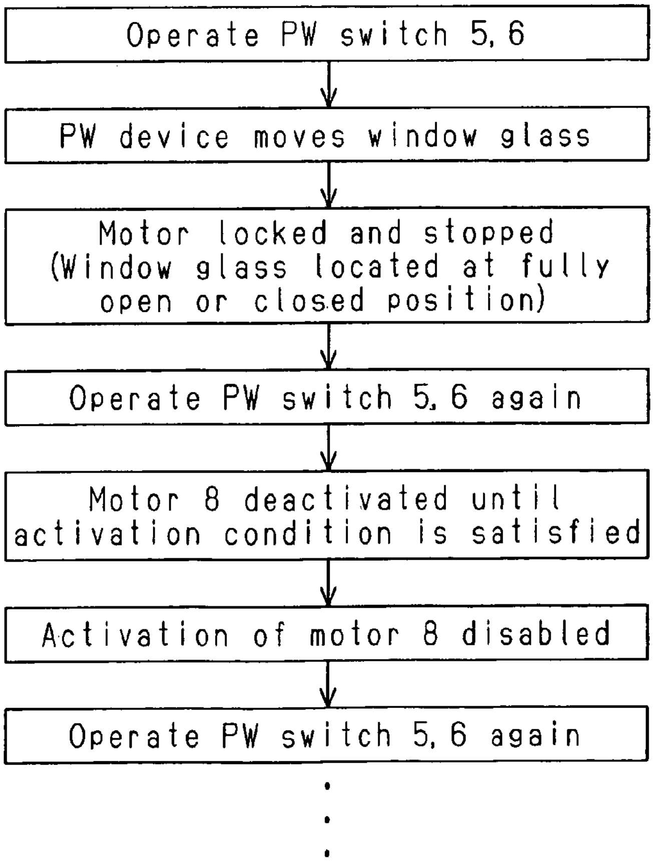
FIG. 3 is a flowchart showing the raising of a window glass with the power window device of FIG. 1.
Figure 4:
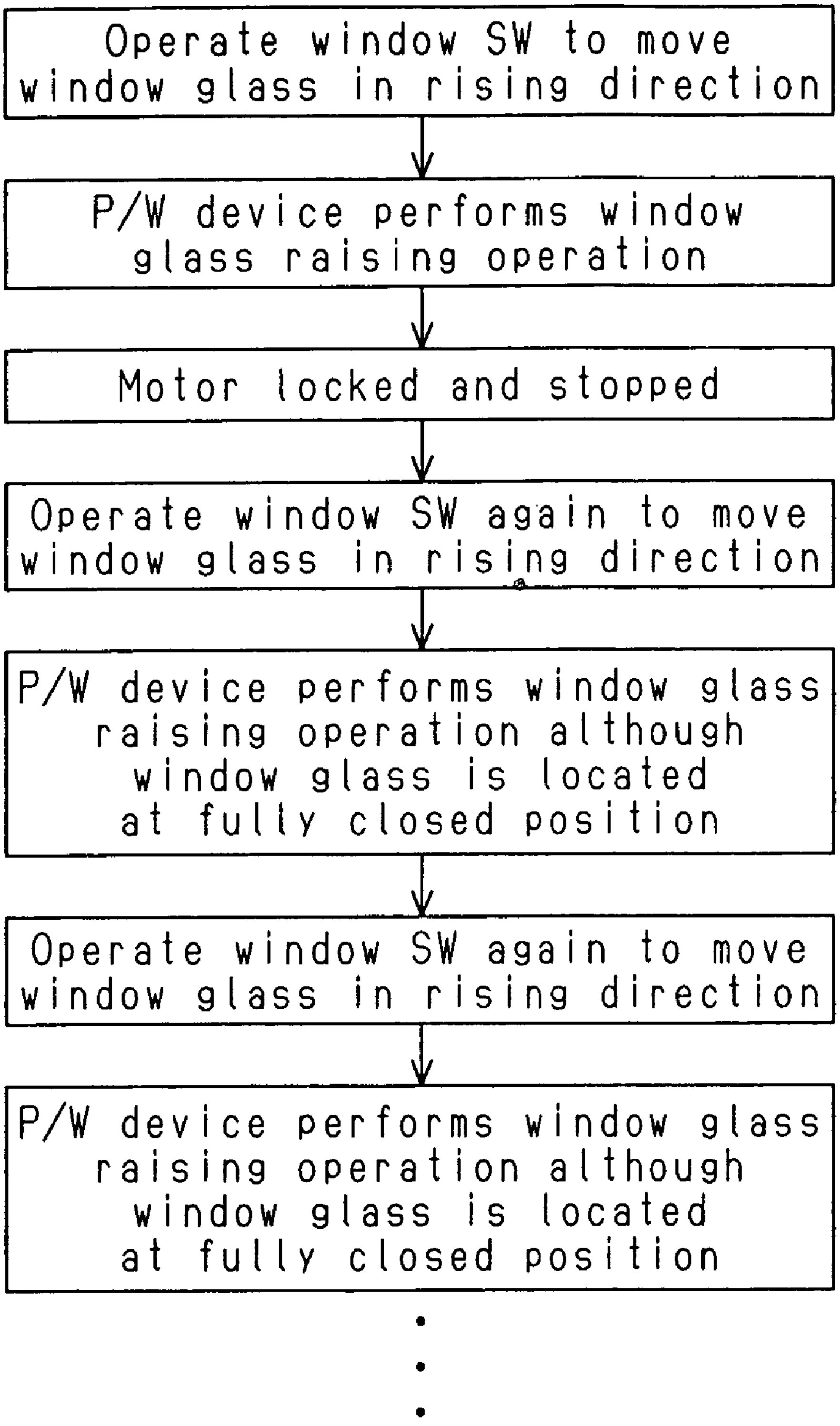
Fig.4 (Prior Art)
FIG. 4 is a flowchart showing the raising of a window glass with a power window device in the prior art.

A power window device 1 according to a preferred embodiment of the present invention will now be discussed with reference to FIGS. 1 to 3.

Figure 1:
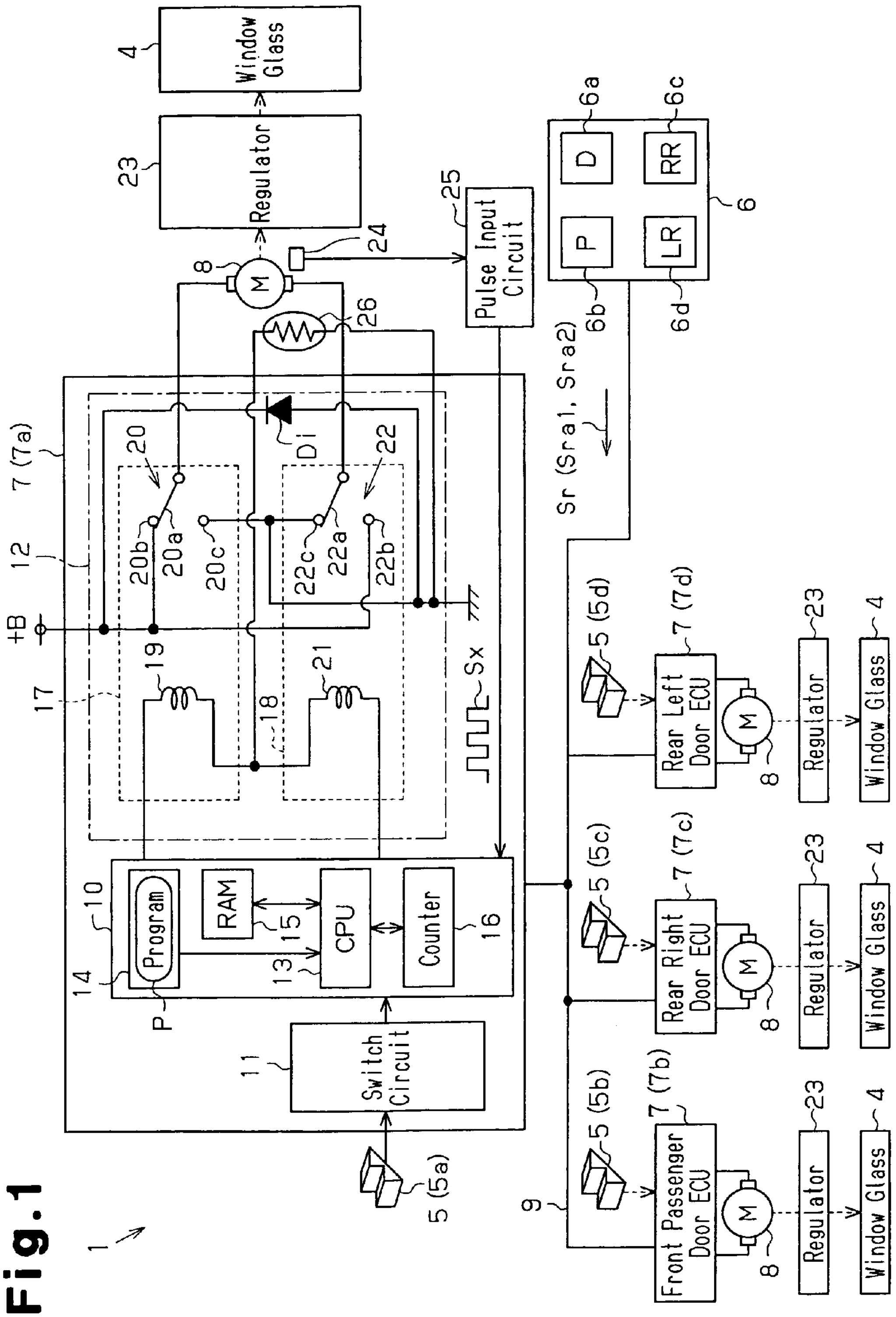
FIG. 1 is an electric circuit diagram of a power window device according to a preferred embodiment of the present invention.

FIG. 1 is an electric circuit diagram of the power window device 1. In this embodiment, the power window device 1 automatically lowers and raises a window glass 4 of a door 3 for a vehicle 2 (refer to FIG. 2). The vehicle doors 3 have power window (PW) switches 5 operated by a vehicle occupant to lower or raise the corresponding window glass 4. In this embodiment, the PW switches 5 include a driver door PW switch 5*a*, a front passenger door PW switch 5*b*, a right rear passenger door PW switch 5*c*, and a left rear passenger door PW switch 5*d*.

Remote PW switches 6 are arranged near the driver seat to remotely control the lowering and raising of the window glass 4 for each door 3 (front, right rear, and left rear doors). The remote PW switches 6 include a driver door PW switch 6*a*, a front passenger door PW switch 6*b*, a right rear passenger door PW switch 6*c*, and a left rear passenger door PW switch 6*d*. Accordingly, the remote PW switches 6 may be used to lower and raise the window glass 4 of any door 3. The window glasses 4 function as window members, and the PW switches 5 and 6 function as actuation mechanisms.

The PW switches 5 and 6 are provided with functions for lowering, raising, automatically lowering, and automatically raising the corresponding window glasses 4. More specifically, the PW switches 5 and 6 are two-step click type tilt switches, which are pushed one step toward one side (lowering side) to lower the corresponding window glass 4 and pushed one step toward the other side (raising side) to raise the corresponding window glasses 4. The PW switches 5 and 6 are also pushed two steps toward either the lowering side or the raising side. This continuously lowers or raises the corresponding window glasses 4 in an automatic state until the window glasses 4 reach a fully closed or open position or until the PW switches 5 and 6 are operated again.

For each door 3 of the vehicle 2, the power window device 1 includes an electronic control unit (ECU) 7, which lowers or raises the corresponding window glass 4 in accordance with the operation of the associated PW switch 5 or remote PW switch 6, and a motor 8, which functions as an actuator that lowers and raises the corresponding window glass 4. In this embodiment, there are four ECUs 7, a driver door ECU 7*a*, a front passenger door ECU 7*b*, a rear right door ECU 7*c*, and a rear left door ECU 7*d*. A signal wire 9 electrically connects the ECUs 7*a* to 7*d*.

Each of the ECUs 7*a* to 7*d* includes a controller 10 that is formed by a microcomputer having various devices, a switch circuit 11 for outputting an electric signal indicating the state of the associated one of the PW switches 5*a* to 5*d*, and a drive circuit 12 for driving the associated motor 8 in accordance with a command from the controller 10. The controller 10 includes a central processing unit (CPU) 13, a read only memory (ROM) 14, a random access memory (RAM) 15, and a counter 16. FIG. 1 shows the circuit configuration of only the ECU 7*a* and does not show the circuit configuration of the other ECUs 7*b* to 7*d*.

The ROM 14 stores a window control program P that is executed when the corresponding window glass 4 is lowered or raised. When the corresponding PW switch 5 or remote PW switch 6 is operated to raise the window glass 4, the control program P is executed to have the motor 8 produce rotation in one direction at a predetermined speed and raise the window glass 4. When the corresponding PW switch 5 or remote PW switch 6 is operated to lower the window glass 4, the control program P is executed to have the motor 8 produce rotation in the other direction at a predetermined speed and lower the window glass 4. The CPU 13 controls the corresponding ECU 7 in a centralized manner and executes the window control program P stored in the ROM 14 to control the lowering or raising of the window glass 4.

The drive circuit 12 functions as a relay, the state of which is switched in response to a control signal of the controller 10 when driving the associated motor 8. More specifically, the drive circuit 12 includes a first relay 17, for switching contact points with a positive terminal of the motor 8, and a second relay 18, for switching contact points with a negative terminal of the motor 8. The first relay 17 includes a coil 19 and a relay contact 20. One end of the coil 19 is connected to the controller 10, and the other end of the coil 19 is connected to a coil 21 of the second relay 18. The second relay 18 includes the coil 21 and the relay contact 22. One end of the coil 21 is connected to the coil 19, and the other end of the coil 19 is connected to the controller 10.

The relay contact 20, the motor 8, and the relay contact 22 form a motor circuit. A diode Di is connected in parallel to the motor circuit between a battery B, which functions as a power supply of the motor circuit, and ground GND. The diode Di has an anode terminal connected to the ground GND and a cathode terminal connected to the battery B. Further, the diode Di keeps the motor 8 activated even if the frequency of the drive circuit 12 becomes high and reduces the current flowing to the motor circuit.

The relay contact 20, which is a transfer contact, includes a movable contact 20*a*, a first fixed contact 20*b*, and a second fixed contact 20*c*. The movable contact 20*a* is connected to one terminal of the motor 8 and is connectable to either one of the first fixed contact 20*b* and the second fixed contact 20*c*. The first fixed contact 20*b* is connected to the battery B, and the second fixed contact 20*c* is connected to the GND. In a normal state in which the coil 19 is de-excited, the movable contact 20*a* is connected to the second fixed contact 20*c*, which is connected to the ground GND. When the coil 19 is excited in response to a command from the controller 10, the movable contact 20 is connected to the first fixed contact 20*b*, which is connected to the battery B.

The relay contact 22, which is a transfer contact, includes a movable contact 22*a*, a first fixed contact 22*b*, and a second fixed contact 22*c*. The movable contact 22*a* is connected to one terminal of the motor 8 and is connectable to either one of the first fixed contact 22*b* and the second fixed contact 22*c*. The first fixed contact 22*b* is connected to the battery B, and the second fixed contact 22*c* is connected to the GND. In a normal state in which the coil 21 is de-excited, the movable contact 22*a* is connected to the second fixed contact 22*c*, which is connected to the ground GND. When the coil 21 is excited in response to a command from the controller 10, the movable contact 22*a* is connected to the first fixed contact 22*b*, which is connected to the battery B.

When lowering the window glass 4 by operating the corresponding PW switches 5 and 6, the controller 10 excites the coil 19 and keeps the coil 21 de-excited. Consequently, the movable contact 20*a* of the relay contact 20 is connected to the first fixed contact 20*b*, while the movable contact 22*a* of the relay contact 22 remains connected to the second fixed contact 22*c*. This produces normal rotation with the motor 8. A regulator 23 transmits the rotation as drive force to the window glass 4 so as to lower the window glass 4.

When raising the window glass 4 by operating the corresponding PW switches 5 and 6, the controller 10 excites the coil 21 and keeps the coil 19 de-excited. Consequently, the movable contact 22*a* of the relay contact 20 is connected to the first fixed contact 22*b*, while the movable contact 20*a* of the relay contact 20 remains connected to the second fixed contact 20*c*. This produces reverse rotation with the motor 8. The regulator 23 transmits the reverse rotation as drive force to the window glass 4 so as to raise the window glass 4.

The remote PW switches 6 are electrically connected to the ECUs 7*a* to 7*d* by the signal wire 9. Each remote PW switch 6 monitors its switching state and sends an operation signal Sr through the signal wire 9 to the ECUs 7*a* to 7*d* in accordance with the switching state. For example, when the front passenger door PW switch 6*b* is operated to lower the corresponding window glass 4, a lowering operation signal Sra1 is sent to the ECUs 7*a* to 7*d*. When the front passenger door PW switch 6*b* is operated to raise the corresponding window glass 4, a raising operation signal Sra2 is sent to the ECUs 7*a* to 7*d*.

Each of the ECUs 7*a* to 7*d* includes information of the corresponding door 3. More specifically, the driver door ECU 7*a* includes information of the driver door 3 in the window control program P. The front passenger door ECU 7*b* includes information of the front passenger door 3 in the window control program P. The rear right door ECU 7*c* includes information of the rear right door 3 in the window control program P. The rear left door ECU 7*d* includes information of the rear left door 3 in the window control program P.

Accordingly, when one of the remote PW switches 6 are operated, the operation signal Sr, which indicates the operated remote PW switch 6, is sent to the ECUs 7*a* to 7*d* so as to activate the associated one of the ECUs 7*a* to 7*d* and lower or raise the corresponding window glass 4. For example, when the front passenger door PW switch 6*b* is operated to lower the corresponding window glass 4, a lowering signal Sra1 is sent to the ECUs 7*a* to 7*d*. The front passenger door ECU 7*b* responds to the lowering signal Sra1 and lowers the window glass 4 of the front passenger door 3.

The window control program P includes an entrapment prevention process for preventing entrapment of an object, such as a vehicle occupant's finger, between the window glass 4 and a window frame 3*a* (refer to FIG. 2) when closing the window. If the entrapment of an object is determined when the window glass 4 is being raised, the entrapment prevention process stops the window glass 4 or starts to move the window glass 4 in the opposite direction. Referring to FIG. 2, the entrapment prevention process is executed by each CPU 13 when the corresponding window glass 4 is being raised in an area in which entrapment may occur. This area extends between a fully open position and a position slightly before the fully closed position and is defined as an entrapment detection area E1. In FIG. 2, the entrapment detection area E1 is shown smaller than the actual state to facilitate illustration.

The entrapment prevention process will now be described in more detail. The power window device 1 includes a pulse sensor 24 for each motor 8 to detect the speed of the rotation produced by the motor 8. Each pulse sensor 24 is connected to the corresponding controller 10 by a pulse input circuit 25. The pulse sensor 24 sends a pulse signal Sx, which is in accordance with the detected rotation speed of the motor 8, via the pulse input circuit 25 to the controller 10. Based on the received pulse signal Sx, the CPU 13 calculates the rotation speed of the motor 8 and determines the present position of the window glass 4.

In this embodiment, the entrapment prevention process is performed based on the pulse signal Sx from the pulse sensor 24. More specifically, the pulse cycle of the pulse signal Sx is short when the rotation speed of the motor 8 is high and long when the rotation speed is low. This factor is used to determine entrapment of an object when the pulse cycle changes. The entrapment of an object between the window glass 4 and the window frame 3*a* restricts the raising of the window glass 4. This lengthens the cycle of the pulse signal Sx. When the pulse cycle becomes longer than a predetermined first cycle threshold Ta, the CPU 13 determines that an object has been entrapped and stops or lowers the window glass 4.

The CPU 13 also uses the pulse signal Sx to determine whether the window glass 4 has reached the fully closed position or the fully open position. The position of the window glass 4 is determined by counting the pulses of the pulse signal Sx. Further, when the window glass 4 reaches the fully closed position or the fully open position, the load applied by the window glass 4 locks the motor 8 such that the motor 8 cannot produce further rotation. Thus, the CPU 13 may also determine that the window glass 4 has reached the fully closed position or the fully open position when the window glass 4 stops moving or when the cycle of the pulse signal Sx becomes long. When the count of the pulses becomes close to a value corresponding to the fully closed position or the fully open position and the cycle of the pulse signal Sx becomes longer than a predetermined second cycle threshold Tb (Tb>Ta), the CPU 13 determines that the window glass 4 has reached the fully closed position or the fully open position.

The power window device 1 includes a positive temperature coefficient (PTC) thermistor 26 arranged in the vicinity of each motor 8. The thermistor 26, which detects the temperature of the corresponding motor 8 and functions as a motor temperature detector, has one end connected between the coils 19 and 21 and another end connected to the ground GND.

An increase in the temperature of the motor 8 increases the temperature of the PTC thermistor 26. The resistance of the thermistor 26 suddenly increases when the motor temperature exceeds a predetermined temperature value. As a result, the PTC thermistor 26 de-excites the excited one of the coils 19 and 21 and stops the flow of current to the motor circuit. This PTC thermistor effect deactivates and cools the motor 8. As the temperature of the motor 8 decreases, the thermistor 26 returns to a normal state. This enables the window glass 4 to be moved again.

When the PTC thermistor effect occurs, the motor 8 is deactivated. In such a state, when the vehicle occupant operates the corresponding PW switches 5 and 6, the pulse sensor 24 does not generate any pulses. Thus, the CPU 13 determines that a pulse failure has occurred and does not respond to the operation of the corresponding PW switches 5 and 6. In such a case, there is a possibility of the vehicle occupant erroneously determining that the power window device 1 has an anomaly. Accordingly, it is preferable that the heating of the motor 8 be avoided so that the PTC thermistor effect does not occur.

Therefore, the window control program P includes a motor deactivation process for deactivating the motor 8 before the PTC thermistor effect occurs. The CPU 13 executes the motor deactivation process when the motor 8 is activated but cannot move the associated window glass 4. For example, the motor deactivation process is executed when the motor 8 becomes locked due to the application of a large load by the window glass 4 or when the window glass 4 reaches the fully closed position of fully open position. The CPU 13 stops executing the motor deactivation process when predetermined activation conditions are satisfied.

In the preferred embodiment, when the window glass 4 is lowered, the motor deactivation process is constantly executed regardless of where the window glass 4 is located. When the window glass 4 is raised, the motor deactivation process is executed in cooperation with the entrapment prevention process if the window glass 4 is located in the entrapment detection area E1. In this case, priority is given to the entrapment prevention process over the motor deactivation process. If the window glass 4 is located outside the entrapment detection area E1, or in an entrapment non-detection area E2 (refer to FIG. 2), when the window glass 4 is being raised, only the motor deactivation process is executed.

During the motor deactivation process, lock detection is performed based on the pulse signal Sx to determine whether the motor 8 is in a locked state. For example, when the window glass 4 is being lowered or raised, the application of a large load to the motor 8 by the window glass 4 will stop the movement of the window glass 4. This prolongs the cycle of the pulse signal Sx. Under the condition that the window glass 4 has not reached the fully open or closed position, the CPU 13 determines that the motor 8 has become locked when the cycle of the pulse signal Sx becomes longer than a predetermined third cycle threshold Tc (Tc>Ta).

When determining that the motor 8 has been locked, the CPU 13 deactivates the motor 8 to forcibly stop the movement of the window glass 4 until an activation condition is satisfied. The CPU 13 also deactivates the motor 8 when the window glass 4 reaches the fully open or fully closed position until an activation condition is satisfied. The window glass 4 can neither be lowered nor raised when the vehicle occupant operates the corresponding PW switches 5 and 6 in a state in which the motor 8 is deactivated.

If an activation condition is satisfied when the motor 8 is deactivated, the CPU 13 ends the motor deactivation process and enables operation of the window glass 4 with the corresponding PW switches 5 and 6. When the CPU 13 starts the motor deactivation process, the counter 16 measures the elapsed time t during which the motor 8 continuously remains deactivated. One example of an activation condition is the elapsed time t exceeding a first time threshold tmax. If the elapsed time t exceeds the first time threshold tmax, the CPU 13 enables activation of the motor 8. The first time threshold tmax is the time required for the heated motor 8 to be sufficiently cooled and is set at, for example, two to nine seconds.

Another example of an activation condition is the PW switches 5 and 6 being tilted again continuously for a predetermined time in the same direction as before the motor deactivation process deactivated the motor 8. For instance, when the window glass 4 is being lowered and the motor 8 becomes hot, the motor deactivation process deactivates the motor 8. Afterwards, if the PW switch 5 and 6 that was being operated when the motor 8 was deactivated is operated again to lower the window glass 4, the CPU 13 measures the operation time s of the PW switch 5 and 6 with the counter 16. If the operation time s exceeds a second time threshold smax, the CPU 13 enables the motor 8 to be activated and lower the window glass 4. The second time threshold smax may be, for example, five seconds.

A further example of an activation condition is the PW switches 5 and 6 being tilted in the opposite direction after the motor deactivation process deactivates the motor 8. For instance, when the window glass 4 reaches the fully open position, the motor deactivation process may deactivate the motor 8. In this case, when determining that the PW switches 5 and 6 have been operated to move the window glass 4 in the opposite direction, or raise the window glass 4, the CPU 13 deactivates the motor 8 and enables the raising of the window glass 4.

The operation of the power window device 1 will now be described with reference to FIG. 3. For example, when one of the PW switches 5 and 6 is operated to lower and open the window glass 4 from the fully closed position, the motor 8 may become locked when the window glass 4 is still being lowered. In such a state, the CPU 13 determines from the pulse signal Sx that the window glass 4 is not located at the fully open position or the fully closed position and that the cycle T of the pulse signal Sx is longer than the third cycle threshold Tc. Thus, the CPU 13 determines that the motor 8 has become locked and then deactivates the motor 8 until an activation condition is satisfied. This prevents the motor 8 from being heated.

When deactivating the motor 8, the CPU 13 de-excites both of the coils 19 and 21 so that the relay contact 20 connects the movable contact 20*a* to the second fixed contact 20*c* and the relay contact 22 connects the movable contact 22*a* to the second fixed contact 22*c*. Further, until an activation condition is satisfied, the CPU 13 keeps the two coils 19 and 21 de-excited and disables activation of the motor 8 even if the switches 5 and 6 are operated.

If the motor 8 becomes locked and the window glass 4 stops moving downward, the vehicle occupant may continue to operate the window switch 5 and 6 or repetitively operate the window switch 5 and 6 to lower the window glass 4. However, even if the window switches 5 and 6 are operated in such a manner, the motor 8 is deactivated when it becomes locked. Thus, current does not flow to the motor 8, and the motor 8 is not heated.

If an activation condition is satisfied when the motor 8 is deactivated, the CPU 13 ends the motor deactivation process and enables the motor 8 to be activated. In the preferred embodiment, the activation of the motor 8 is enabled when (1) the elapsed time t from when the motor deactivation started exceeds the first time threshold tmax, (2) the operation time s of the PW switch 5 and 6 for moving the window glass 4 in the same direction as when the motor 8 was deactivated exceeds the second time threshold smax, or (3) the PW switch 5 and 6 is operated to move the window glass 4 in the direction opposite to the direction the window glass 4 was moving when the motor 8 was deactivated. If the activation of the motor 8 is enabled, the operation of the window glass 4 with the corresponding PW switches 5 and 6 is enabled again.

For example, the vehicle occupant may operate the PW switches 5 and 6 and raise the window glass 4 to the fully closed position. In this state, the CPU 13 determines that the window glass 4 has reached the fully closed position based on the counted pulses of the pulse signal Sx and the cycle of the pulse signal Sx becoming longer than the second cycle threshold Tb. When determining that the window glass 4 has reached the fully closed position, the CPU 13 deactivates the motor 8 until an activation condition is satisfied. This prevents the motor 8 from being heated.

When the window glass 4 reaches the fully closed position, the vehicle occupant may not immediately recognize this state. Thus, the vehicle occupant may continue to operate the corresponding PW switch 5 and 6 for a while even after the window glass 4 reaches the fully closed position. In this case, if the activation of the motor 8 were enabled after the window glass 4 reaches the fully closed position, current would flow to the motor 8 even though there is no need to activate the motor 8. This may also heat the motor 8. However, in the preferred embodiment, the activation of the motor 8 is disabled when the window glass 4 reaches the fully closed position. Thus, current does not flow to the motor 8 even if the PW switches 5 and 6 are operated after the window glass 4 reaches the fully closed position. Further, the motor 8 is not heated when raising the window glass 4 to the fully closed position.

If the motor 8 is heated until the motor temperature exceeds the predetermined temperature value, the PTC thermistor effect takes place and disables movement of the window glass 4 no matter how the PW switches 5 and 6 are operated. Thus, it is preferable that the occurrence of the PTC thermistor effect be avoided. Accordingly, the motor deactivation process is executed in the preferred embodiment. This avoids heating of the motor 8 and reduces the occurrence of the PTC thermistor effect.

The vehicle occupant may perform automatic raising of the window glass 4 by pushing the corresponding PW switch 5 and 6 two steps toward the window raising side so that the window glass 4 continuously rises even if the vehicle occupant releases the PW switch. In this state, if the motor 8 becomes locked as the window glass 4 rises when the window glass 4 is located in the entrapment detection area E1, the entrapment prevention process is executed instead of the motor deactivation process. Thus, the locking of the motor 8 in this case would either stop or reverse the rotation generated by the motor 8. Afterwards, the motor 8 would be supplied with current to start raising the window glass 4 again since the corresponding switch 5 and 6 has been operated to perform automatic raising of the window glass 4. Such operations of the motor 8 would be repeated as long as the motor 8 remains locked.

In this case, based on the operation signal from the PW switches 5 and 6, the CPU 13 determines that automatic raising of the window glass 4 is being performed. Further, the CPU 13 uses the counter 16 to measure the operation time x from when the motor 8 becomes locked. If the vehicle occupant operates the PW switches 5 and 6 to stop the automatic raising before the operation time exceeds a predetermined time value xmax, the automatic raising of the window glass 4 is stopped. Subsequently, the entrapment prevention process is executed when the window glass 4 is raised again in the entrapment detection area E1.

However, if the vehicle occupant does not operate the PW switches 5 and 6, automatic raising of the window glass 4 continues even when the operation time x exceeds the predetermined time value xmax. In this case, the CPU 13 starts the execution of the motor deactivation process and deactivates the motor 8. Thus, even if the window glass 4 is located in the entrapment detection area E1, the motor 8 undergoes the motor deactivation process depending on the circumstance. Accordingly, the motor 8 cools down during the period it is deactivated. This suppresses the heating of the motor 8.

During automatic raising of the window glass 4, if the motor 8 becomes locked when the window glass 4 is located in the entrapment non-detection area E2, the CPU 13 executes only the motor deactivation process to deactivate the motor 8. When automatic lowering of the window glass 4 is performed, if the window glass 4 becomes locked and the operation time x exceeds the predetermined time value xmax, the CPU 13 always executes the motor deactivation process and deactivates the motor 8 regardless of where the window glass 4 is located.

The preferred embodiment has the advantages described below.

(1) When the motor 8 becomes locked or when the window glass 4 reaches the fully closed or fully open position, the motor 8 is deactivated until an activation condition is satisfied. Thus, the motor 8 is not supplied with current when unnecessary, and heating of the motor 8 is avoided. Since the temperature of the motor 8 does not become high, the occurrence of the PTC thermistor effect is reduced.

(2) Since a condition for activating the motor 8 is a predetermined time elapsing from when the motor 8 is deactivated (elapsed time t becoming greater than or equal to the time threshold tmax), the heating of the motor 8 is prevented as long as the time threshold tmax is set in correspondence with the time for sufficiently cooling the motor 8.

(3) One condition for activating the motor 8 is the PW switches 5 and 6 being pushed continuously over a predetermined time in the same direction as when motor 8 was deactivated (operation time s being greater than or equal to threshold smax). For example, if the window frame 3*a* is deformed thereby causing the motor 8 to become locked when raising the window glass 4, the raising of the window glass 4 would be enabled by continuously operating the corresponding PW switches 5 and 6. Thus, the window glass 4 may forcibly be moved to the fully closed position. Further, the motor 8 remains deactivated until this activation condition is satisfied. This ensures sufficient time for cooling the motor 8.

(4) One condition for activating the motor 8 is the PW switches 5 and 6 being pushed in a direction opposite to the direction the switches 5 and 6 were pushed when the motor 8 was deactivated. Thus, when the window glass 4 reaches the fully closed or fully open position, the window glass 4 may immediately be moved in the opposite direction. For example, when the window glass 4 reaches the fully open position and the motor 8 is deactivated, activation of the motor 8 would immediately be enabled if the corresponding PW switches 5 and 6 are operated to raise the window glass 4. This allows the vehicle occupant to raise the window glass 4 from the fully open position without any awkward feel. Further, unless this activation condition is satisfied, motor deactivation continues. This ensures sufficient time for cooling the motor 8.

(5) If the PW switches 5 and 6 are operated to perform automatic raising of the corresponding window glass 4 and the motor 8 becomes locked when the window glass 4 is located in the entrapment detection area E1, the motor 8 is deactivated when the operation time x during which the automatic raising is being performed exceeds a predetermined value. During such automatic raising, the motor 8 tends to become easily heated. Thus, it becomes necessary to provide time for cooling the motor 8. Accordingly, the preferred embodiment provides sufficient cooling time for the motor 8.

It should be apparent to those skilled in the art that the present invention may be embodied in many other specific forms without departing from the spirit or scope of the invention. Particularly, it should be understood that the present invention may be embodied in the following forms.

A pulse signal does not necessarily have to be used to determine whether the motor 8 is locked or whether the window glass 4 has reached the fully open or fully closed position. For example, a shunt resistor may be included in the motor circuit of the motor 8. In this case, when the current flowing through the motor 8 exceeds a predetermined value, it is determined that the motor 8 is locked or that the window glass 4 has reached the fully open or fully closed position.

The time thresholds tmax and smax, the predetermined time value xmax, and the first to third cycle threshold Ta to Tc may be varied as required. Further, the third cycle threshold Tc may be set at different values when the window glass 4 is raised and when the window glass 4 is lowered.

The PTC thermistor 26 does not necessarily have to be used to prevent excessive heating of the motor 8. For example, a temperature sensor may be arranged in the vicinity of the motor 8 to detect the motor temperature and send a detection signal to the CPU 13. In this case, the CPU 13 calculates the motor temperature from the detection signal and deactivates the motor 8 when the calculated motor temperature exceeds a predetermined temperature value.

Any type of sensor, for example, an optical sensor or a magnetic sensor, may be used as the pulse sensor 24, which detects the speed of the rotation generated by the motor 8. Further, the rotation speed of the motor 8 does not necessarily have to be detected by the pulse sensor 24 and may be any type of sensor as long as the rotation speed can be detected.

The window glass 4 does not necessarily have to be driven by the motor 8 and may be driven by other driving means such as a cylinder.

The power window device 1 does not necessarily have to be used for the window glasses 4 of a vehicle and may also be used for the window glasses of buildings, such as houses. Further, the vehicle does not necessarily have to be an automobile and may be any type of vehicle, such as a train or an industrial vehicle.

The present examples and embodiments are to be considered as illustrative and not restrictive, and the invention is not to be limited to the details given herein, but may be modified within the scope and equivalence of the appended claims.

What is claimed is:

1. A power window device for moving a window member in a first direction and a second direction opposite the first direction, the power window device comprising:

a switch operated when moving the window member in the first direction or the second direction;

an actuator for moving the window member in accordance with the operation of the switch;

a sensor for generating a detection signal that is based on activation state of the actuator and indicates whether or not the window member is moving; and a controller, connected to the switch, the actuator, and the sensor, for activating the actuator in response to the operation of the switch to move the window member, determining from the sensor detection signal when the window member is not moving even though the actuator is activated, deactivating the actuator if the determination is that the window is not moving and the actuator is activated, and enabling activation of the deactivated actuator when a predetermined activation condition is satisfied.

2. The power window device according to claim 1, further comprising:

a power supply for supplying power to the actuator in accordance with the operation of the switch; and a motor temperature detector, arranged in the vicinity of the actuator, for monitoring temperature of the actuator and terminating supply of power to the actuator from the power supply when the temperature of the actuator becomes greater than a predetermined value, wherein the controller deactivates the actuator before the motor temperature detector terminates supply of power to the actuator from the power supply.

3. The power window device according to claim 2, wherein when the controller determines that the window member is not moving even though the actuator is activated, the controller deactivates the actuator for a predetermined period and enables activation of the deactivated actuator when the predetermined period lapses, thereby satisfying the predetermined activation condition.

4. The power window device according to claim 2, wherein:

when activating the actuator to move the window member in the first direction in accordance with the operation of the switch and determining that the window member is not moving in the first direction even though the actuator is activated, the controller deactivates the actuator; and when the switch is continuously operated for a predetermined time to move the window member in the first direction, the controller determines that the predetermined activation condition is thereby satisfied and enables the deactivated actuator to be activated.

5. The power window device according to claim 2, wherein:

when activating the actuator to move the window member in the first direction in accordance with the operation of the switch and determining that the window member is not moving in the first direction even though the actuator is activated, the controller deactivates the actuator; and when the switch is operated to move the window member in the second direction, the controller determines that the predetermined activation condition is thereby satisfied and enables the deactivated actuator to be activated.

6. The power window device according to claim 2, wherein:

when activating the actuator to move the window member in the first direction in accordance with the operation of the switch and determining that the window member is not moving in the first direction even though the actuator is activated, the controller deactivates the actuator for a predetermined period; and when the switch is operated to move the window member in the second direction, the controller determines that the predetermined condition is thereby satisfied and enables the deactivated actuator to be activated before the predetermined period elapses.

7. The power window device according to claim 1, wherein a window frame supports the window member, and when the controller has activated the actuator to move the window member in the first direction in accordance with the operation of the switch, the controller determines from the detection signal whether an object has become entrapped between the window member and window frame, and if the controller determines an object has become entrapped, the controller deactivates the actuator or activates the actuator to move the window member in the second direction.

8. The power window device according to claim 1, wherein the sensor generates a pulse signal including a plurality of pulses having a cycle varied in accordance with activation state of the actuator, and the controller determines whether or not the window member is moving based on the pulse cycle of the pulse signal.

9. The power window device according to claim 8, wherein the controller determines that the window member is not moving when the pulse cycle of the pulse signal generated by the sensor lengthens.

10. A power window device for moving a window member in a first direction and a second direction opposite the first direction, the power window device comprising:

a switch operated when moving the window member in the first direction or the second direction;

an actuator for moving the window member in accordance with the operation of the switch;

a sensor for generating a detection signal that is based on activation stale of the actuator and indicates whether or not the window member is moving; and a control means, connected to the switch, the actuator, and the sensor, for activating the actuator in response to the operation of the switch to move the window member, determining from the sensor detection signal when the window member is not moving even though the actuator is activated, deactivating the actuator if the determination is that the window is not moving and the actuator is activated, and enabling activation of the deactivated actuator when a predetermined activation condition is satisfied.

11. The power window device according to claim 10, further comprising:

a power supply for supplying power to the actuator in accordance with the operation of the switch; and a motor temperature detector, arranged in the vicinity of the actuator, for monitoring temperature of the actuator and terminating supply of power to the actuator from the power supply when the temperature of the actuator becomes greater than a predetermined value, wherein the control means deactivates the actuator before the motor temperature detector terminates supply of power to the actuator from the power supply.

12. The power window device according to claim 11, wherein when the control means determines that the window member is not moving even though the actuator is activated, the control means deactivates the actuator for a predetermined period and enables activation of the deactivated actuator when the predetermined period lapses thereby satisfying the predetermined activation condition.

13. The power window device according to claim 11, wherein:

when activating the actuator to move the window member in the first direction in accordance with the operation of the switch and determining that the window member is not moving in the first direction even though the actuator is activated, the control means deactivates the actuator; and when the switch is continuously operated for a predetermined time to move the window member in the first direction, the control means determines that the predetermined activation condition is thereby satisfied and enables the deactivated actuator to be activated.

14. The power window device according to claim 11, wherein:

when activating the actuator to move the window member in the first direction in accordance with the operation of the switch and determining that the window member is not moving in the first direction even though the actuator is activated, the control means deactivates the actuator; and when the switch is operated to move the window member in the second direction, the control means determines that the predetermined activation condition is satisfied and enables the deactivated actuator to be activated.

15. The power window device according to claim 11, wherein:

when activating the actuator to move the window member in the first direction in accordance with the operation of the switch and determining that the window member is not moving in the first direction even though the actuator is activated, the control means deactivates the actuator for a predetermined period; and when the switch is operated to move the window member in the second direction, the control means determines that the predetermined condition is satisfied and enables the deactivated actuator to be activated before the predetermined period elapses.

16. A power window device for moving a window member in a first direction and a second direction opposite the first direction, the power window device comprising:

a switch operated when moving the window member in the first direction or the second direction;

a power supply which supplies power to the actuator in accordance with the operation of the switch; and an actuator for moving the window member in accordance with the operation of the switch;

a sensor for generating a detection signal that is based on activation state of the actuator and indicates whether or not the window member is moving;

a controller, connected to the switch, the actuator, and the sensor, for activating the actuator in response to the operation of the switch to move the window member, determining from the sensor detection signal when the window member is not moving even though the actuator is activated, deactivating the actuator if the determination is that the window is not moving and the actuator is actuated, and enabling activation of the deactivated actuator when a predetermined activation condition is satisfied;

a motor temperature detector, arranged in the vicinity of the actuator, for monitoring temperature of the actuator and disconnecting the actuator from the power supply when the temperature of the actuator becomes greater than a predetermined value, wherein the controller deactivates the actuator before the motor temperature detector disconnects the actuator from the power supply.

17. The power window device according to claim 16, wherein when the controller determines that the window member is not moving even though the actuator is activated, the controller deactivates the actuator for a predetermined period and enables activation of the deactivated actuator when the predetermined period lapses thereby satisfying the predetermined activation condition.

18. The power window device according to claim 16, wherein;

when activating the actuator to move the window member in the first direction in accordance with the operation of the switch and determining that the window member is not moving in the first direction even though the actuator is activated, the controller deactivates the actuator; and when the switch is continuously operated for a predetermined time to move the window member in the first direction, the controller determines that the predetermined activation condition is thereby satisfied and enables the deactivated actuator to be activated.

19. The power window device according to claim 16, wherein:

when activating the actuator to move the window member in the first direction in accordance with the operation of the switch and determining that the window member is not moving in the first direction even though the actuator is activated, the controller deactivates the actuator; and when the switch is operated to move the window member in the second direction, the controller determines that the predetermined activation condition is thereby satisfied and enables the deactivated actuator to be activated.

20. The power window device according to claim 16, wherein:

when activating the actuator to move the window member in the first direction in accordance with the operation of the switch and determining that the window member is not moving in the first direction even though the actuator is activated, the controller deactivates the actuator for a predetermined period; and when the switch is operated to move the window member in the second direction, the controller determines that the predetermined activation condition is thereby satisfied and enables the deactivated actuator to be activated before the predetermined period elapses.

* * * * *

UNITED STATES PATENT AND TRADEMARK OFFICE

CERTIFICATE OF CORRECTION

PATENT NO. : 7,535,191 B2 Page 1 of 1
APPLICATION NO. : 11/355635
DATED : May 19, 2009
INVENTOR(S) : Takayuki Adachi et al.

It is certified that error appears in the above-identified patent and that said Letters Patent is hereby corrected as shown below:

Column 12
Line 24, delete “stale” and insert therefor -- state --.

Signed and Sealed this

First Day of September, 2009

David J. Kappos
*Director of the United States Patent and Trademark Office*